United States Patent [19]

Mundus et al.

[11] Patent Number: 4,811,879
[45] Date of Patent: Mar. 14, 1989

[54] APPARATUS FOR MOVING A CARRIAGE OR THE LIKE

[75] Inventors: Friedhelm Mundus, Lengerich; Hans-Ludwig Voss, Tecklenburg, both of Fed. Rep. of Germany

[73] Assignee: Windmöller & Hölscher, Lengerich, Fed. Rep. of Germany

[21] Appl. No.: 73,129

[22] Filed: Jul. 14, 1987

[30] Foreign Application Priority Data

Jul. 14, 1986 [DE] Fed. Rep. of Germany ....... 3623699
Apr. 7, 1987 [DE] Fed. Rep. of Germany ....... 3711653

[51] Int. Cl.⁴ ........................................... B65H 17/36
[52] U.S. Cl. .................................... 226/136; 226/118; 226/134
[58] Field of Search ............... 226/118, 134, 136, 148, 226/149, 58

[56] References Cited

U.S. PATENT DOCUMENTS

| | | | |
|---|---|---|---|
| 3,863,823 | 2/1975 | Allred | 226/148 X |
| 4,089,451 | 5/1978 | Zlaikha | 226/148 X |
| 4,333,593 | 6/1982 | Bihler et al. | 226/158 X |
| 4,552,294 | 11/1985 | Rotzler | 226/149 X |

FOREIGN PATENT DOCUMENTS

3234227 7/1983 Fed. Rep. of Germany .

Primary Examiner—Stuart S. Levy
Assistant Examiner—Katherine Matecki
Attorney, Agent, or Firm—Fleit, Jacobson, Cohn & Price

[57] ABSTRACT

An apparatus is disclosed which serves to move a carriage in one direction over a predetermined distance at a substantially uniform velocity and to return the carriage at a varying velocity so that a film web delivered at a constant velocity is intermittently advanced relative to a welding device fixed to a frame. The apparatus comprises a lever, which is adapted to be pivotally oscillated by a drive and which by virtue of a first guide provided on the lever and a slider or roller cooperating with the guide imparts a motion to the carriage. The carriage is movable on track rods in a plane which is parallel to the plane in which the lever is pivotally movable. In order to provide an apparatus which is compact and space-saving, the lever is driven by a crank, which revolves in a plane parallel to the plane in which the lever is pivotally movable. The crank is carried by a driven crankshaft and carries a crankpin, which carries a slider or a roller, which is movable in a second guide provided on the lever, which second guide is provided on the lever, which second guide is disposed on a side of the lever opposite the side in which the first guide is provided.

7 Claims, 7 Drawing Sheets

APPARATUS FOR MOVING A CARRIAGE OR THE LIKE

BACKGROUND OF THE INVENTION

1. Field of the Invention

This invention relates to apparatus for moving a carriage or the like in one direction over a predetermined distance at a substantially uniform velocity and for returning the carriage at a varying velocity, which apparatus serves preferably to intermittently advance a plastic film web relative to a welding or cutting device fixed to a frame or for cyclically advancing a welding device with a plastic film web moving at the same velocity. The apparatus comprises a lever, which is adapted to be pivotally oscillated by a drive and which by means of a first guide provided on and extending along said lever and a slider or roller cooperating with said guide imparts a motion to the carriage. The carriage is movable on tracks in a plane which is parallel to the plane in which the lever is pivotally movable. The slider or the bearing for the roller is mounted on a holder, which is guided for a displacement along a line constituting the base of an isosceles triangle, the sides of which are defined by the lever at the end positions of its pivotal movement.

2. Description of the Prior Art

Two similar apparatus are disclosed in German Patent Specification No. 32 34 227. These apparatus have so-called synchronizing cam mechanisms, which have proven highly satisfactory but have the disadvantage that they occupy a large space. The pivotally oscillatable levers for driving the carriage of this publication consist of two-armed levers having a driving arm which is provided with cam follower rollers, which embrace a cam rib that is formed on a rotating cam-wheel and from which the drive motion is derived.

SUMMARY OF THE INVENTION

It is an object of the invention to provide an apparatus which is of the kind described hereinbefore which is compact and space-saving.

In an apparatus of the kind described, this object is accomplished in accordance with the invention by having the means for driving the lever comprise a crank, which revolves in a plane that is parallel to the plane in which the lever is pivotally movable. The crank is carried by a driven crankshaft and carries a crankpin, which carries a slider or a roller, which is movable in a second guide provided on the lever. The second guide is disposed on that side of the lever which is opposite to a first guide. In the apparatus in accordance with this invention, the crank for driving the lever is covered by the lever so that the arrangement may be compact and space-saving.

An embodiment of the apparatus in accordance with the invention can be used to process a web, particularly a tubular film web, which is moved through the apparatus, for instance, in the manufacture of sacks having transverse seam welds or having punched holes. It may also be desired to use the apparatus in accordance with the invention for processing preferably tubular webs in order to sever separate sections, such as bags provided with seams at their bottom and/or top ends, from the web and to remove the separate sections individually, in a shingled arrangement or in a stack.

For this reason an embodiment of the invention constitutes an apparatus for handling a film web which is supplied at a constant velocity and is intermittently advanced relative to a transverse severing or transverse hot wire welding device that is fixed to a frame. In the apparatus, rollers are rotatably mounted on end portions of the carriage and extend transversely to the direction in which the carriage is displaceable. An endless belt is disposed around the rollers and comprises an upper course, which in the configuration of loops is disposed around reversing rollers which are fixed to the carriage. The belt also comprises a lower course, which in the configuration of a loop is disposed around feed rollers for advancing the film web. The film web moves from the feed rollers to and around that of the rollers on the carriage which is the rearmost of said rollers with respect to the direction in which the web is supplied, and to and around a first of a pair of feed rollers, which is intermittently driven by the upper course of the belt.

In this embodiment, those rollers which are rotatably mounted on the carriage and those rollers which are rotatably mounted in the frame are driven and coupled to each other by the endless belt which is disposed around the rollers so that the rollers are operatively connected to the feed rollers for advancing the incoming film web. The film web, however, is not disposed around all of the rollers. In this embodiment, the film web is disposed only around the carriage mounted roller which is the rearmost of the reversing rollers with respect to the incoming film web, and around the first of a pair of feed rollers, which is intermittently driven by the upper course of the belt. As a result, the film web can be advanced further in any desired manner behind the first roller or may be severed to form sections, which may be deposited as desired.

The first of the pair of feed rollers, which is rotatably mounted on the frame and is intermittently driven by the upper course of the belt, suitably consists of one roller of a second pair of feed rollers for advancing the film web. That roller or that second pair of feed rollers may be succeeded by a receiving table or by a receiving conveyor belt and a transverse hot wire welding device or a transverse cutting device may be provided between the second pair of feed rollers, on the one hand, and the receiving table or receiving belt, on the other hand, and may be operated to sever sections from the web or to sever bags from the tubular film web.

The crank mechanism of the invention is driven in such a manner that welding tools carried by the carriage are moved in synchronism with the film web over the longest possible distance or for the longest possible time, or else in such a manner that the film web can be arrested, when the welding device is stationary. For this purpose it is within the scope of the invention to secure the crankpin in a crankpin holder, which is guided along a crank on a radial guide of the crank. The crankpin is provided with a portion which carries a cam follower slider or roller, which is movable with the desired characteristic in an annular cam track, which is fixed to the frame and surrounds the crankpin.

To permit the size of the workpieces to be changed in a simple manner, it is within the scope of the invention that the tracks for the carriage are parallel to the base of an isosceles triangle and that the carriage is provided with a third guide oriented at right-angles to the above-mentioned tracks and which serves to guide the holder for the roller that is guided in the first guide of the lever. The holder is adjustable along the third guide by adjusting means.

DETAILED DESCRIPTION OF THE PREFERRED EMBODIMENT

An illustrative embodiment of the invention will now be explained in detail with reference to the drawing figures.

Figure 1:
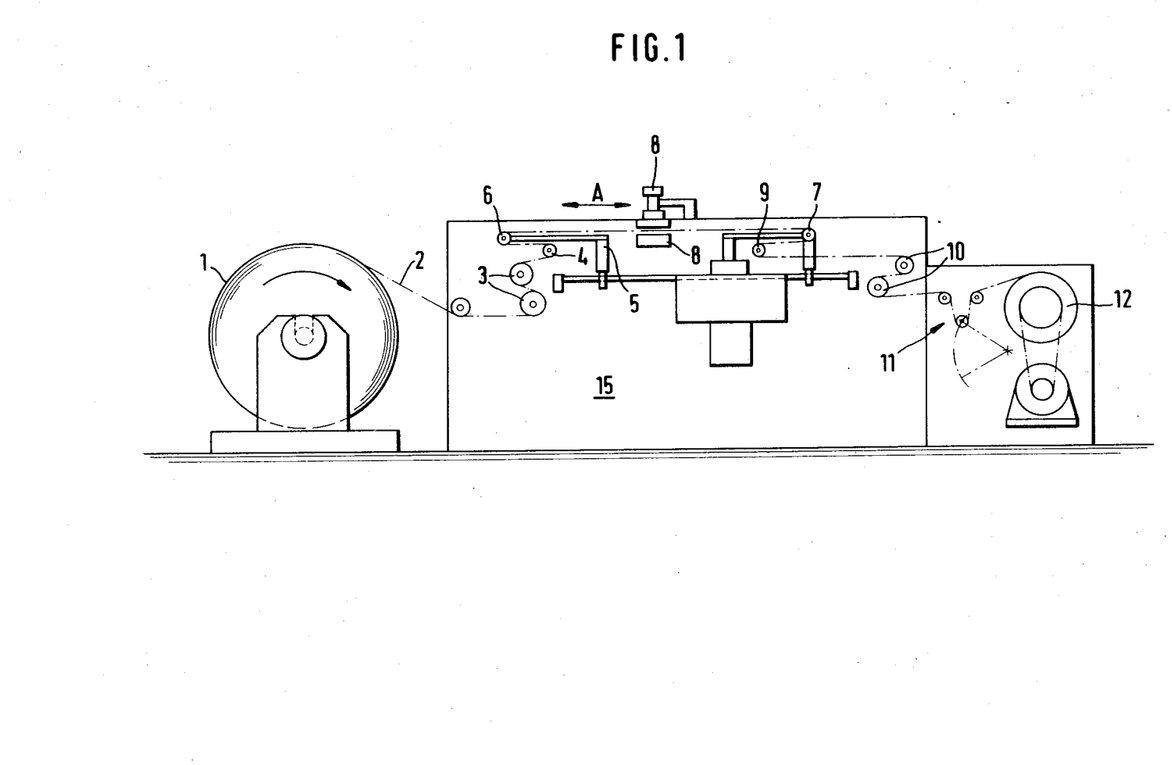
FIG. 1 is a side elevation showing a sealing machine.

The sealing machine illustrated in FIG. 1 comprises a stand, in which a supply roll 1 is rotatably mounted. Feed rollers 3 are operable to withdraw from supply roll 1 a continuous tubular film web 2, which is to be processed in the manufacture of bags or sacks. From feed rollers 3 the tubular film web 2 moves around a deflecting roller 4, which is mounted at a fixed position in the frame 15, and around two spaced apart reversing rollers 6 and 7, which are rotatably mounted in a carriage 5. A conventional welding or sealing device 8, which is fixed to the frame, is disposed between rollers 6 and 7 to intermittently provide seam seals to tubular film web 2. After the tubular film web 2 has been provided with seam seals, it moves around deflecting roller 9, which is mounted in a fixed position in the frame 15, and around feed rollers 10 to a buffer consisting of a jockey roller 11. From the buffer, the film web 2 moves to a take-up reel 12 for winding up the tubular film web provided with seam seals to form a supply roll.

The carriage 5 is provided with guide brackets 13, which embrace track rods 14. Track rods 14 serve to guide the guide brackets 13 in a manner to be described. The end portions of two track rods 14 are fixed to the machine frame 15 on opposite sides of the machine frame so that the carriage 5 is reciprocated on the track rods 14 in the direction indicated by the arrow A in FIG. 1. Movement of carriage 5 is made possible by cooperation of a rocker lever 22 with a guide groove 16, which is provided on the carriage, an adjusting nut 17, which is guided in the guide groove 16, and an adjusting screw 18, which cooperates with the nut 17 to displace the latter axially a long screw 18 in the groove 16. A pin 19 is fixed to the nut 17. At the end of pin 19 which is remote from the nut 17 is carried a roller 20, which is guided in a guide groove 21. Guide groove 21 is formed in the rocker lever 22, which is pivoted on a pivot 23 mounted in a mechanism housing 24. Housing 24 is connected to the frame 15.

Figure 3:
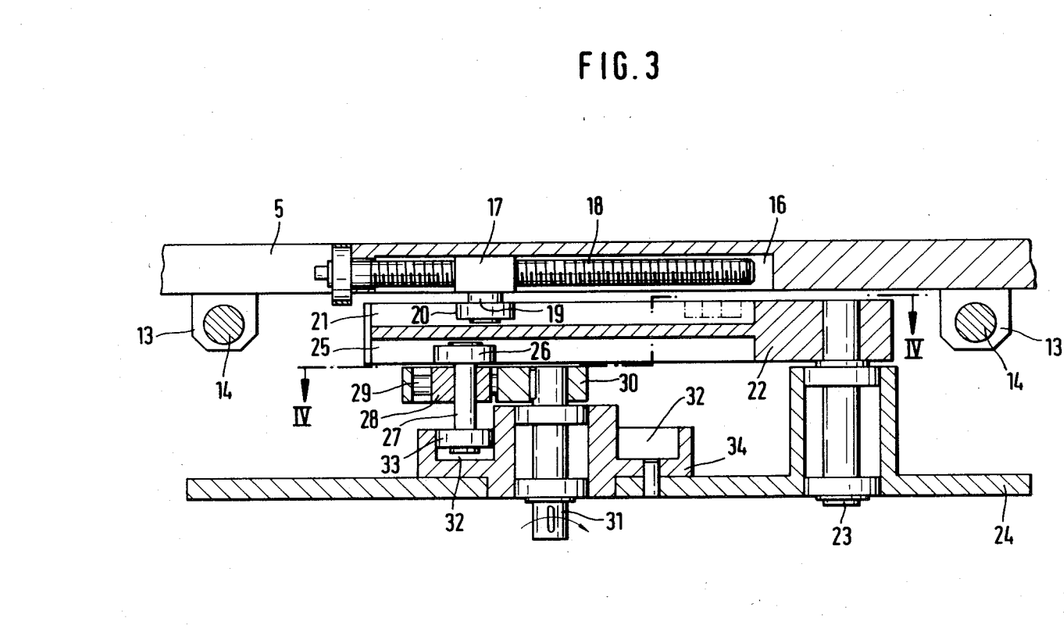
FIG. 3 is a longitudinal sectional view showing the synchronizing cam mechanism of the carriage drive; taken on line III—III in FIG. 2
Figure 4:
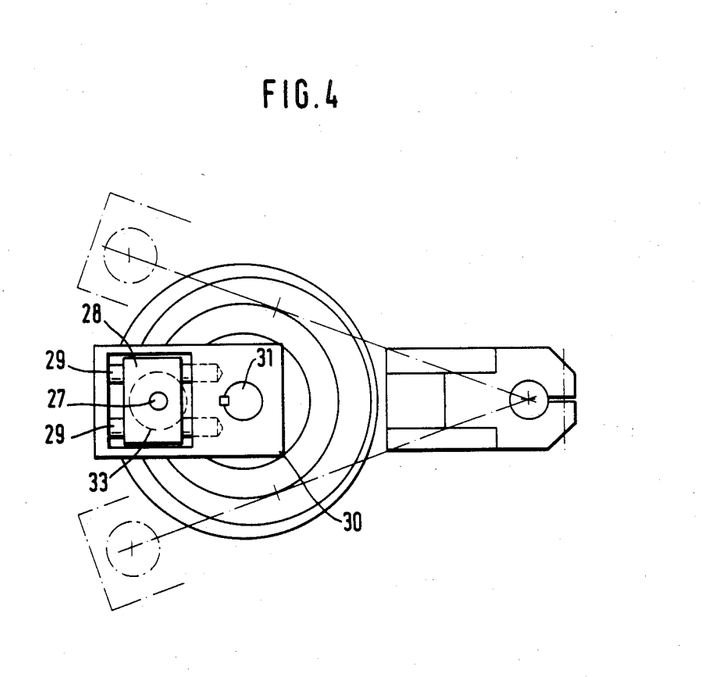
FIG. 4 is a sectional view taken on line IV—IV in FIG. 3 and showing the synchronizing cam mechanism.

As is apparent from FIG. 3, the rocker lever 22 is provided with a second guide groove 25 parallel to the guide groove 21 and which guides a roller 26. Roller 26 is mounted on one end of a crankpin 27. The crankpin 27 is carried by a crankpin holder 28, which is mounted in crank web 30 for displacement on guide rods 29. Crank web 30 is secured to the crankshaft 31.

Crankpin holder 28 is displaced along the guide rods 29 during each revolution of the crankshaft 31. The extent to which crankpin holder 28 is displaced is determined by the design of a cam groove 32, which guides a cam follower roller 33 mounted on the crankpin 27 at an end thereof which is opposite to the roller 26. The cam groove 32 is formed in a hub 34, which is fixed to the housing 24.

Figure 2:
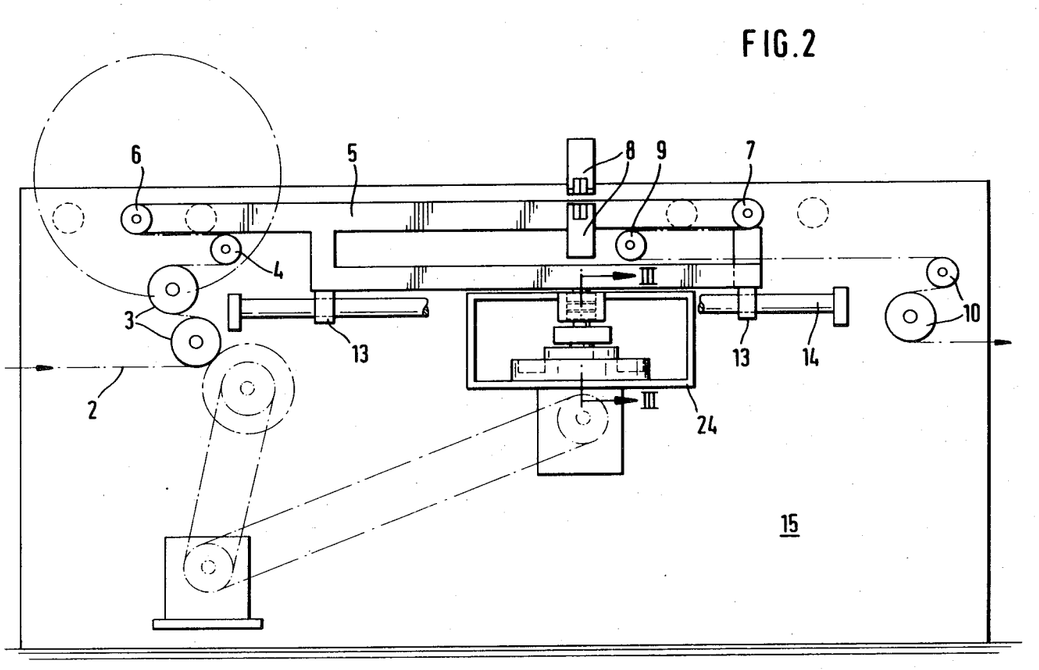
FIG. 2 is an enlarged view showing the carriage and the carriage drive of the sealing machine according to FIG. 1.
Figure 7:
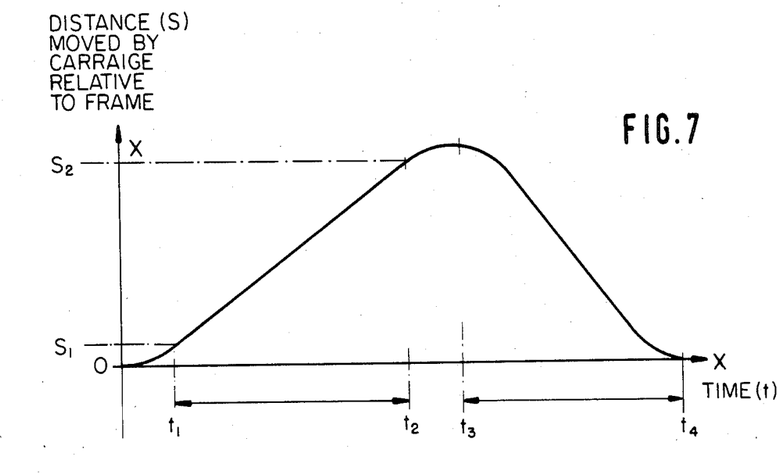
FIG. 7 is a displacement-time graph for the operations of the synchronizing cam mechanism.
Figure 8:
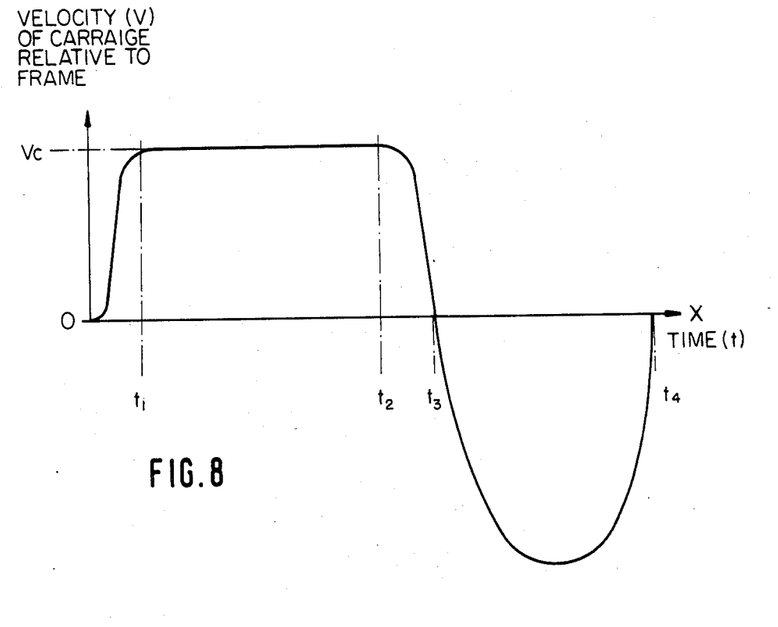
FIG. 8 is a velocity graph of the operation of the synchronizing cam mechanism.

Cam groove 32 is so designed that carriage 5 moves along track rods 14 relative to frame 15 at a constant velocity ($V_c$) over a predetermined distance ($S_2$-$S_1$) during a predetermined time ($t_2$-$t_1$) as crankpin holder 28 revolves, as is apparent from the graphs in FIGS. 7 and 8. It should also be clear from FIGS. 7 and 8 that the cam groove is designed so that carriage 5 is returned to its original position at a varying velocity over time ($t_4$-$t_3$). Carriage 5 and the reversing rollers 6 and 7 carried by the carriage 5 are displaced at a constant velocity during sealing such that there is no relative movement between the continuously fed tubular or semitubular film web 2 and the sealing device 8 during sealing. An intermittent standstill of the tubular film web 2 relative to sealing device 8 during sealing can thus be achieved by a corresponding movement of the carriage. In FIG. 2 the rollers 6 and 7 are illustrated by dotted lines in the respective positions they assume in the end of travel positions of the carriage 5.

Figure 5:
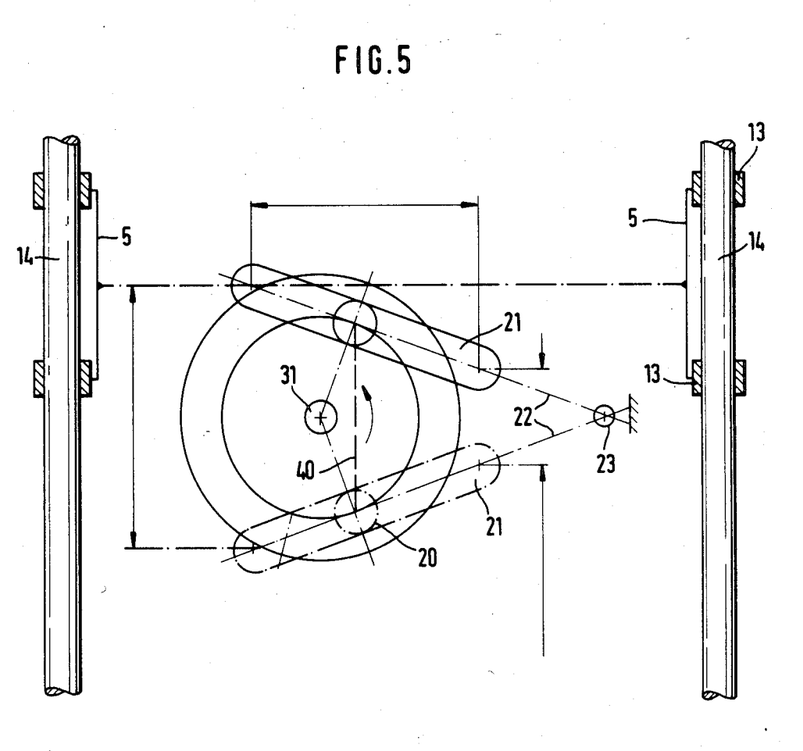
FIG. 5 is a diagrammatic top plan view showing the synchronizing cam mechanism and illustrating a change of size.
Figure 6:
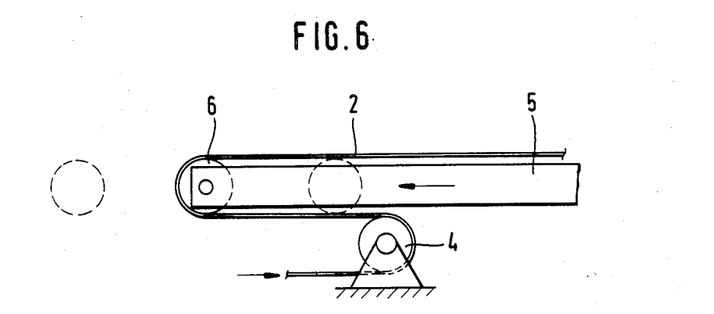
FIG. 6 is an enlarged view showing the region which is defined in FIG. 2 by a dash-dot line.

FIG. 5 shows diagrammatically the carriage 5, which is displaceable on track rods 14. The rocker lever 22, which is pivoted on the pivot 23, is indicated in phantom. The guide groove 21 disposed on the top of the rocker lever 22 is also shown. The roller 20 is guided in the guide groove 21. Roller 20 is adjustable by a movement of the nut 17 in guide groove 16 of the carriage 5 so that the stroke of the carriage 5 can be adjusted from a maximum to a minimum. Because the roller 20 is held in its adjusted position relative to the carriage by screw 18, the roller 20 is guided along one of an infinite number of lines which are parallel to the track rods 14. One of these lines is indicated by a dotted line at 40 in FIG. 5, where it is apparent that the line 40 constitutes the base of an isosceles triangle having sides which are defined by the rocker lever 22 in end positions of its pivotal movement.

Figure 9:
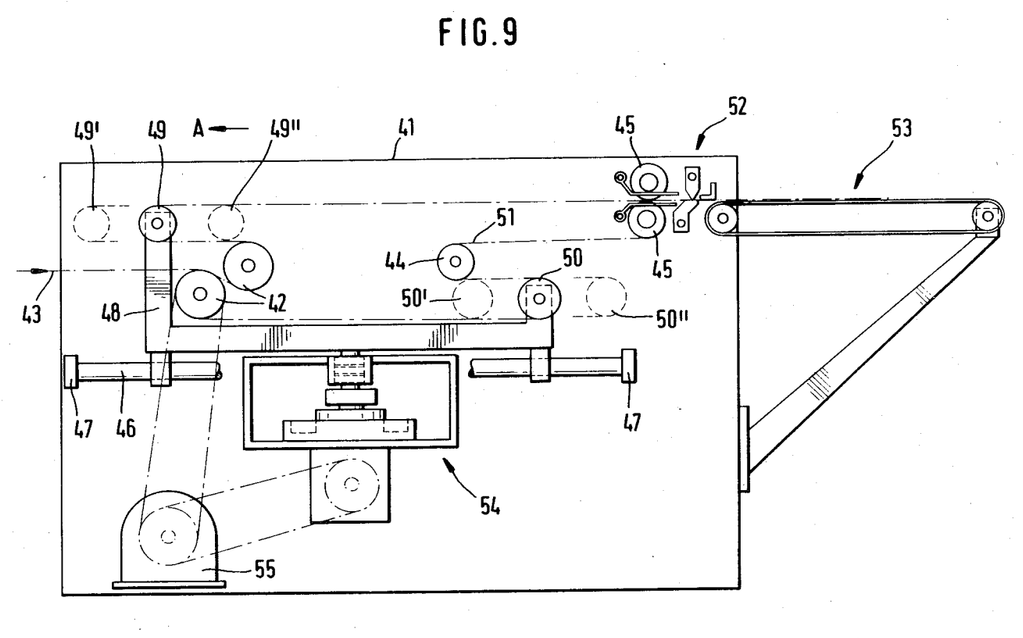
FIG. 9 shows a second embodiment of a sealing machine for making bags provided with bottom seam welds.

In the apparatus shown in FIG. 9, bags provided with bottom seam welds are severed by hot wire welding from the tubular film web 43 which has been received by the apparatus and are deposited on a stacking belt. The apparatus comprises two side frames. Only one of said side frames is shown in FIG. 9 for the sake of clarity and is designated 41. A pair of feed rollers 42 are rotatably mounted in side frame 41 and are operated to continuously advance the tubular film web 43. A reversing roller 44 and a pair of feed rollers 45 are also rotatably mounted in the side frame 41. Two parallel track rods 46, only one of which is visible in FIG. 9, are provided below the pair of feed rollers 42 and are connected by crossbars 47 to the side frame that is not shown and to the side frame 41. A carriage 48 is slidably mounted on the track rods 46 and carries two reversing rollers 49 and 50. The carriage 48 is driven in the manner which has been described with reference to FIGS. 1 to 8. It should be apparent from the drawing that an endless belt 51 moves between the pair of feed rollers 42 and is disposed around the reversing roller 49, the lower roller of the pair of feed rollers 45, the reversing roller 44 and the reversing roller 50. The tubular web 43 is continuously advanced by the pair of feed rollers 42 and is disposed around the reversing roller 49. After tubular film web 43 passes around the reversing roller 49 it is intermittently advanced by the pair of feed rollers 45. A device 52, which is known per se and is fixed to the frame, is operated in step with the pair of feed rollers 45 to weld and sever individual tube sections from the web 43 and to provide them, for instance, with a bottom seam. The individual tube sections which have been severed may be deposited on a receiving conveyor belt or receiving table 53.

In FIG. 9, carriage 48 moves in the direction of the arrow A during a welding operation. The carriage moves in this direction until reversing roller 49 has reached the position indicated by dotted lines at 49' and reversing roller 50 has reached the position indicated by dotted lines at 50'. That movement of the carriage 48 results in a storage of the web 43, which is continuously supplied. Shortly before the carriage 48 has reached its lefthand end position, the welding jaws are opened and movement of the carriage 48 is reversed. The carriage 48 is then moved to its righthand end position, which is indicated by reversing roller positions 49" and 50". As a result, the pair of feed rollers 45 advance the web over a distance which corresponds to the length in which the web has been stored plus the length in which the feed rollers 42 have advanced the web during the movement of the carriage 48 in the direction which is opposite to the arrow A. The synchronizing cam mechanism 54 and the motor 55 may be adjusted when a change of tube section size is desired.

We claim:

1. An apparatus for moving a carriage or the like in one direction over a predetermined distance at a substantially uniform velocity and for returning the carriage at a varying velocity, which apparatus intermittently advances a plastic film web relative to a welding device that is fixed to a frame, comprising
    a lever, which is adapted to be pivotally oscillated by a means for driving the lever and which by means of a first guide provided on said lever and extending along said lever and a first slider or roller cooperating with said guide imparts a motion to said carriage, which is movable on tracks in a plane parallel to a plane in which the lever is pivotally movable,
    the first slider or roller being mounted on a holder, which is guided for a displacement along a line, which constitutes the base of an isosceles triangle, the sides of which are defined by the lever at end positions of its pivotal movement, and
    the means for driving the lever comprising a crank, which revolves in a plane that is parallel to the plane in which the lever is pivotally movable, said crank carried by a driven crankshaft and carrying a crankpin, which carries a second slider or roller movable in a second guide provided on the lever, said second guide disposed on a side of the lever opposite to the side on which the first guide is provided.

2. An apparatus according to claim 1, and further comprising
    reversing rollers rotatably mounted on and fixed to end portions of the carriage, each reversing roller having an axis extending transversely to the direction in which the carriage is displaceable,
    an endless belt disposed around said reversing rollers and comprising an upper course disposed around said reversing rollers fixed to the carriage and a lower course disposed around a first pair of feed rollers for advancing the film web, the film web moving from the feed rollers to and around that of the reversing rollers on the carriage which is the rear most of said reversing rollers on the carriage with respect to the direction in which the web is supplied, and to a second pair of feed rollers fixed to the frame, the film web being intermittently driven by the second pair of feed rollers.

3. An apparatus according to claim 2, characterized in that the second pair of feed rollers is intermittently driven by the upper course of the endless belt.

4. An apparatus according to claim 3, characterized in that the second pair of feed rollers is succeeded by a receiving conveyor belt, and a transverse hot wire welding and cutting device is provided between said second pair of feed rollers and said receiving belt.

5. An apparatus according to claim 1, characterized in that said crankpin is secured in a crankpin holder, which is guided along the crank by radial guide means of the crank, said crankpin being provided with a crankpin portion carrying a cam follower slider or roller, which is movable in an annular cam track fixed to the frame and surrounding the crankpin.

6. An apparatus according to claim 5, characterized in that said radial guide means comprise guide rods secured to the crankpin holder and aligned with each other.

7. An apparatus according to claim 1, characterized in that said tracks on which the carriage is movable are parallel to the base of the isosceles triangle and in that the carriage is provided with a third guide oriented at right-angles relative to said tracks serving to guide the holder for the slider or roller, said slider or roller being guided in the first guide of the lever, and said holder being adjustable along the third guide by adjusting means.

* * * * *